(12) United States Patent
Foltin et al.

(10) Patent No.: US 12,243,205 B2
(45) Date of Patent: Mar. 4, 2025

(54) METHOD FOR AVOIDING A FIELD OF VIEW DISTURBANCE FOR AN OPERATOR OF AN OBJECT, DEVICE FOR CARRYING OUT THE METHOD AS WELL AS VEHICLE AND COMPUTER PROGRAM

(71) Applicant: VOLKSWAGEN AKTIENGESELLSCHAFT, Wolfsburg (DE)

(72) Inventors: Dorit Foltin, Wolfsburg (DE); Andreas Gäde, Peine (DE); Christian Becker, Meine (DE); Sandro Schwertner, Zittau (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 451 days.

(21) Appl. No.: 17/043,786

(22) PCT Filed: Oct. 9, 2019

(86) PCT No.: PCT/EP2019/077334
§ 371 (c)(1),
(2) Date: Sep. 30, 2020

(87) PCT Pub. No.: WO2020/088902
PCT Pub. Date: May 7, 2020

(65) Prior Publication Data
US 2021/0354705 A1  Nov. 18, 2021

(30) Foreign Application Priority Data

Nov. 1, 2018 (DE) ...................... 10 2018 218 746.0

(51) Int. Cl.
*G06V 10/26* (2022.01)
*B60W 40/09* (2012.01)
(Continued)

(52) U.S. Cl.
CPC .......... *G06T 7/0002* (2013.01); *B60W 40/09* (2013.01); *G06T 3/4053* (2013.01); *G06T 7/11* (2017.01);
(Continued)

(58) Field of Classification Search
CPC ....... G06T 7/0002; G06T 3/4053; G06T 7/11; G06T 7/97; B60W 40/09; B60W 2420/42;
(Continued)

(56) References Cited

U.S. PATENT DOCUMENTS

| 9,390,560 B2 | 7/2016 | Meier et al. |
| 2002/0105484 A1 | 8/2002 | Navab et al. |

(Continued)

FOREIGN PATENT DOCUMENTS

| CN | 103959341 A | 7/2014 |
| CN | 107018397 A | 8/2017 |

(Continued)

OTHER PUBLICATIONS

Office Action; Chinese Patent Application No. 201980006242.2; Feb. 20, 2023.
Search Report for International Patent Application No. PCT/EP2019/077334; Jan. 13, 2020.

*Primary Examiner* — Kito R Robinson
*Assistant Examiner* — Roy Rhee
(74) *Attorney, Agent, or Firm* — Barnes & Thornburg LLP (57) ABSTRACT

A method for avoiding a field of view disturbance for an operator of an object. The field of view disturbance IS caused by the overlay of virtual additional information via a display unit of a transportation vehicle or data glasses. The overlay of additional information supports the operator in the operation of an object. The method carries out an image analysis by which it is checked whether a field of view disturbance is caused by the overlay of the virtual additional (Continued)

information, and a measure for suppressing the field of view disturbance is carried out when a field of view disturbance is detected.

23 Claims, 8 Drawing Sheets

(51) Int. Cl.
    *G06T 3/4053* (2024.01)
    *G06T 7/00* (2017.01)
    *G06T 7/11* (2017.01)
    *G06V 20/56* (2022.01)

(52) U.S. Cl.
    CPC ............... *G06T 7/97* (2017.01); *G06V 10/26* (2022.01); *G06V 20/56* (2022.01); *B60W 2420/403* (2013.01); *B60W 2554/4048* (2020.02)

(58) Field of Classification Search
    CPC ................ B60W 2554/4048; G06V 10/26; G06V 20/56
    See application file for complete search history.

(56) References Cited

U.S. PATENT DOCUMENTS

| | | |
|---|---|---|
| 2013/0194110 A1 | 8/2013 | Kim et al. |
| 2016/0049013 A1* | 2/2016 | Tosas Bautista ...... G06T 19/006 345/633 |
| 2018/0288337 A1 | 10/2018 | Kuehne |

FOREIGN PATENT DOCUMENTS

| | | |
|---|---|---|
| DE | 102004034532 A1 | 2/2006 |
| DE | 102005037797 A1 | 2/2007 |
| DE | 102007045834 A1 | 4/2009 |
| DE | 102012010120 A1 | 11/2013 |
| DE | 102012216057 A1 | 5/2014 |
| DE | 102014008152 A1 | 10/2014 |
| DE | 102013016241 A1 | 4/2015 |
| DE | 102013021150 A1 | 6/2015 |
| DE | 102014019013 A1 | 6/2015 |
| JP | 2008209212 A | 9/2008 |
| WO | 2016184541 A1 | 11/2016 |

\* cited by examiner

METHOD FOR AVOIDING A FIELD OF VIEW DISTURBANCE FOR AN OPERATOR OF AN OBJECT, DEVICE FOR CARRYING OUT THE METHOD AS WELL AS VEHICLE AND COMPUTER PROGRAM

PRIORITY CLAIM

This patent application is a U.S. National Phase of International Patent Application No. PCT/EP2019/077334, filed 9 Oct. 2019, which claims priority to German Patent Application No. 10 2018 218 746.0, filed 1 Nov. 2018, the disclosures of which are incorporated herein by reference in their entireties.

SUMMARY

Illustrative embodiments relate to the technical field of driver information systems, which are also known by the term infotainment system. Such systems are used primarily in transportation vehicles. However, it is also possible to use the illustrative embodiments in the case of pedestrians, cyclists, etc., using smartglasses. Illustrative embodiments further relate to a correspondingly designed apparatus for performing the method and to a transportation vehicle and to a computer program.

BRIEF DESCRIPTION OF THE DRAWINGS

Exemplary embodiments are illustrated in the drawings and will be explained in more detail below with reference to the figures, in which.

DETAILED DESCRIPTION

It is a future vision in the automotive industry to be able to reproduce virtual elements on the windshield of one's own transportation vehicle to offer the driver a few benefits. What is known as "augmented reality" technology (AR technology) is used here. The corresponding German term "erweiterte Realität" is less well-known. In this case, the real surroundings are enriched with virtual elements. This has several benefits: it obviates the need to look down at displays other than the windshield because many relevant pieces of information are imaged onto the windshield. The driver therefore has no need to take their gaze off the road. What is special about AR representations is that the position-accurate localization of the virtual elements in the real environment is possible. In addition, the virtual element is superposed at the location where the driver aims their gaze in the real environment. With these superpositions, the real environment can be "overlaid" from the view of the user and be provided with additional information, for example, a navigation path can be superposed. Thus, less cognitive effort on the part of the driver is achieved because there is no need to interpret an abstract graphic, and instead intuitive comprehension as part of the normal perception habits can take place.

Currently, head-up displays (HUDs) are used in transportation vehicles. These also have the benefit that the image of the HUD appears to be closer to the real environment. The displays are actually projection units that project an image onto the windshield. However, from the view of the driver, this image is located a few meters up to 15 meters in front of the transportation vehicle, depending on the construction type of the module. This has the benefit that the superposed information is presented such that the eyes of the driver themselves are relieved of the accommodation action.

The "image" is here composed of the following: it is less a virtual display but rather a type of "keyhole" into the virtual world. The virtual surroundings are theoretically overlaid on the real world and contain the virtual objects that assist and inform the driver during the journey. Due to the limited display surface of the HUD, a section thereof can be seen. In other words, the section of the virtual world is seen through the display surface of the HUD. Since these virtual surroundings supplement the real surroundings, the term "mixed reality" is also used in this case.

Intensive work relating to technologies that are intended to make autonomous driving possible in the future is likewise currently underway. A first approach is here not to completely relieve the driver of their tasks but to ensure that the driver can assume control of the transportation vehicle at any time. The driver additionally performs monitoring functions. Owing to recent technologies in the field of driver information systems such as head-up displays (HUDs), it is possible to better inform the driver about the events in the vicinity of their transportation vehicle.

To realize that, the use of recent technologies (vehicle-to-vehicle communication, use of databases, vehicle sensor system, etc.) is necessary so that comprehensive information relating to objects (in particular, transportation vehicles) in the direct vicinity of one's own transportation vehicle will be available. In the field of vehicle sensor systems, in particular, the following components that make observation of the vicinity possible are mentioned: RADAR devices a.k.a. radio detection and ranging, LIDAR devices a.k.a. light detection and ranging, mainly for the field of distance capturing/warning, and cameras having corresponding image processing for the field of object detection. These data relating to the environment can be used as a basis for system-based driving recommendations, warnings, etc. For example, displays/warnings relating to the direction into which another transportation vehicle in the vicinity wishes to turn (possibly into the own trajectory) are thus conceivable.

Vehicle-to-vehicle communication has meanwhile also become possible using mobile communication with systems such as LTE a.k.a. long-term evolution. In this respect, the organization 3GPP has issued a specification called LTE V2X. Alternatives available are systems for the vehicle direct communication based on WLAN technology, in particular, the system according to WLAN p. The most recent mobile radio generation 5G, which likewise enables V2V or V2X communication, is also mentioned here.

Owing to the current development toward higher autonomy levels, yet where many transportation vehicles continue to be controlled by the driver, it must be assumed that corresponding additional information can already be used in the medium term for manually controlled transportation vehicles rather than only for highly automated systems in the longer term. The solution which will be described in more detail below can here be used both for manually controlled and for automatically controlled transportation vehicles.

DE 10 2012 010 120 A1 discloses a method for setting a head-up display of a transportation vehicle. The method can be used to also set the position of the eyebox. The eyebox here relates to a region in the transportation vehicle in which the eyes of the driver must be located for them to be able to perceive the virtual image on the windshield. For this purpose, a test image is projected onto the windshield and at least one edge region of the eyebox is recorded with a camera.

DE 10 2005 037 797 A1 discloses an apparatus for automatically calibrating a projection device for a head-up display of a transportation vehicle, in which calibration that is able to be automated is possible. In that case, the data calculated for the geometry de-warping and multi-projector calibration are stored in what are known as warp fields.

A major benefit of the "augmented reality" displays (AR displays) known to date is to represent the corresponding displays directly within or as part of the environment. Relatively obvious examples typically relate to the field of navigation. While conventional navigation displays (in conventional HUDs) generally display schematic representations (e.g., an arrow extending at a right angle to the right to indicate that a right turn should be taken as soon as possible), AR displays offer significantly more effective possibilities. Since the displays can be represented as "part of the environment," extremely fast and intuitive interpretations are possible for the user. Nevertheless, the approaches that have been used to date also have various problems for which currently no solutions are known. This was recognized as part of the disclosure. One problem area relates to the occurrence of field-of-view disturbances, which are caused by the superposition of virtual additional information into the field of view of the driver. Such field-of-view disturbances can relate to the obscuration of objects in the real environment. Another type of disturbances relates to the distraction of the operator or of the driver in the case of the use in a transportation vehicle. This can occur if a blinking, flashing or pulsing representation is caused by successive superposition.

Superposed navigation paths and superposed traffic signs (speed limits, danger symbols, etc.) are large-area superpositions that can obscure real objects. There is thus a requirement for further improvements when superposing virtual additional information into the field of view of the operator. The disclosed embodiments provide such an approach.

This is achieved by a method for avoiding a field-of-view disturbance for an operator of an object, by an apparatus for performing the method, by a transportation vehicle, and by a computer program.

The solution in accordance with the proposal consists in a method for avoiding a field-of-view disturbance for an operator of an object, wherein virtual additional information relating to a display unit is superposed into the field of view of the operator. In this case, an image analysis is performed with which it is checked whether the superposition of the virtual additional information causes a field-of-view disturbance, and wherein a measure for preventing the field-of-view disturbance is taken if a field-of-view disturbance has been detected. This solution can be used to quickly detect and quickly prevent the described field-of-view disturbances. The method is continuously performed, which means that all superpositions can be checked. In this way, the potential dangers associated with the field-of-view disturbances are lessened.

In at least one exemplary embodiment of the method, an image analysis is performed with which it is checked whether the superpositions cause a problem relating to the obscuration of regions in the field of view of the operator. Obscurations can harbor great potential dangers, in particular, if moving objects are obscured and, as a result, if a collision is imminent because the operator cannot detect the object.

In another exemplary embodiment of the method, an image analysis of a plurality of successive images with superpositions of virtual additional information is performed, with which it is checked whether the superpositions cause a bothersome blinking, flashing or pulsing in the field of view of the operator. The potential dangers of such superpositions lie in a distraction of the operator. The measure therefore offers the benefit that such field-of-view disturbances can also be prevented.

In a concrete configuration of the proposal, the image analysis for revealing problems relating to the obscuration of regions in the field of view of the operator lies in an analysis of a number of successive images, wherein the image is divided, image-to-image, into increasingly fine segments, and the segments are analyzed individually. In this way, local regions in the image can be constrained further and further at the location where an obscuration occurs.

In at least one exemplary embodiment, the filling degree of the respective image or of the respective segment that is brought about by the superposition of the virtual additional information is ascertained in the image analysis operation. For example, if the filling degree in such a segment is 100%, it is clear that an object that can be seen therein is being obscured.

The filling degree can beneficially be realized by calculating the ratio of the number of image points that have been filled by the superposition of the virtual additional information to the total number of the image points that can be filled. This type of calculation can be realized without great complexity using a special chip, e.g., an FPGA chip, which are also utilizable cost-effectively in a product.

To detect a risk of obscuration, the procedure in at least one exemplary embodiment can be as follows. For performing a check relating to obscuration of regions in the field of view, in each case three successive images are analyzed, wherein for the first image the filling degree of the total image is determined, for the second image the filling degrees of four image segments of identical size are determined, and for the third image the filling degrees of nine image segments of identical size are determined. The total number of the image segments here in each case covers the entire image. In another exemplary embodiment, it is also possible for further images to be taken into account in the analysis operation. This also depends on how powerful the special chip is that is to be performing the image analysis.

To detect a risk of obscuration, the procedure in another exemplary embodiment can be as follows. For performing a check relating to obscuration of regions in the field of view, successive images are analyzed, wherein the images are divided into different segments. First, the total image is considered as one segment. Second, the image is divided into four image segments of identical size. Third, the image is divided into nine image segments of identical size. Then the filling degrees of the respective image segments are determined. How quickly the image segments can be analyzed depends on how powerful the special chip that is to be performing the image analysis is.

It is beneficial if the ascertained filling degrees of the image and the segments are checked in stages and a problem relating to the obscuration of regions in the field of view of the operator is detected if the check leads to an ascertainment that at least one of the checked criteria has been met. If a larger segment is already highly filled, this will also apply to the corresponding segments of the finer division.

It is furthermore beneficial if, for checking whether the superpositions cause a bothersome blinking, flashing or pulsing in the field of view of the operator, the ascertained filling degrees of a number of successive check cycles are analyzed, wherein a problem relating to a bothersome blinking, flashing or pulsing of the superpositions in the field of view of the operator is detected if periodic changes of the ascertained filling degrees are ascertained. This algorithm can be realized best by way of software using a microcomputer.

To prevent the field-of-view disturbance, it is beneficial if the superposition is turned off or the brightness of the superposition is decreased. This measure can be performed easily using the method or mechanism present in the head-up display. Changing the calculation of the images for the superpositions would require greater development complexity.

It is beneficial for an apparatus for performing the method if the apparatus has a display unit with which virtual additional information can be superposed into the field of view of the operator of the object and has an interface for receiving images with which the virtual additional information can be superposed into the field of view of the operator, wherein the apparatus has an image analysis unit and an evaluation unit, with which it is checked whether a field-of-view disturbance is caused by the superposition of the virtual additional information and that the image analysis unit and evaluation unit are furthermore designed to prevent the field-of-view disturbance if a field-of-view disturbance has been detected. This apparatus can be realized as part of a head-up display HUD for a transportation vehicle. Alternatively, it can be used in smartglasses or a monitor on which a camera image is displayed into which the additional information is superposed.

At least one exemplary embodiment of the disclosed apparatus also consists in the fact that the image analysis unit and the evaluation unit are furthermore designed to switch off the superposition or decrease the brightness of the superposition if a field-of-view disturbance has been detected. This measure can be realized particularly easily in a head-up display.

The disclosed apparatus can be used in a transportation vehicle. In the transportation vehicle, the disclosed embodiments may be realized such that the apparatus is fixedly installed in the transportation vehicle, for example, as a head-up display.

As mentioned, the disclosed embodiments may also be used if the display unit as smartglasses. In this case, the disclosed method can be used even for pedestrians, cyclists, motorcyclists etc.

The corresponding benefits as described relating to the disclosed method also apply to a computer program executed in a computation unit of the apparatus for performing the disclosed method.

The present description illustrates the principles of the disclosure. It is thus understood that a person skilled in the art will be able to devise different arrangements that, although not explicitly described here, still embody the principles of the disclosure and are intended to likewise be protected by the scope of the disclosure.

Figure 1:
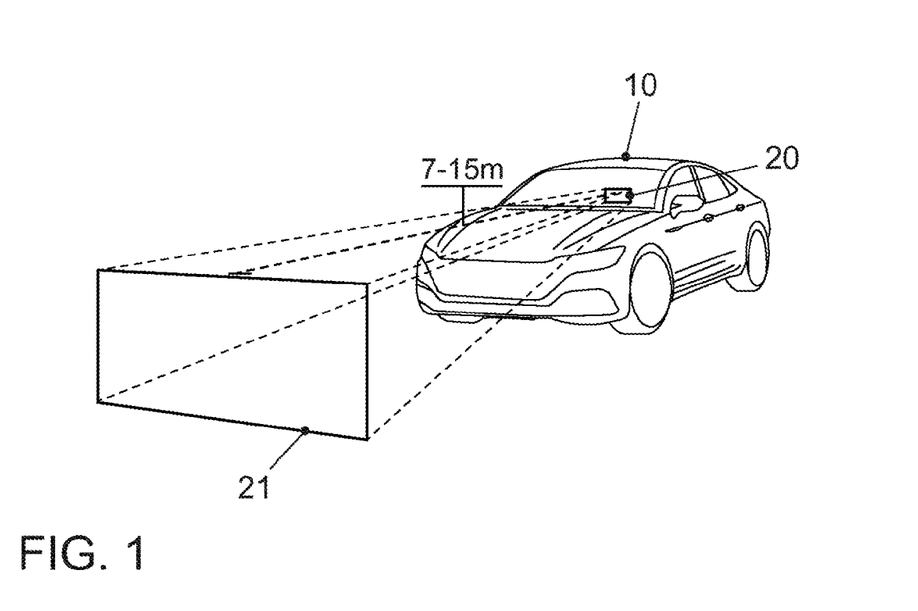
FIG. 1 shows the principle of the superposition of information into the field of view of the driver of a transportation vehicle during the journey with the aid of a head-up display.

FIG. 1 illustrates the principle method of function of a head-up display. The head-up display 20 is mounted in the transportation vehicle 10 below/behind the instrument cluster in the dashboard region. Additional information is superposed into the field of view of the driver by projection onto the windshield. The additional information appears as if it were projected onto a projection surface 21 at a distance of 7-15 m in front of the transportation vehicle 10. Yet the real world remains visible through this projection surface 21. Virtual surroundings, as it were, are created with the superposed additional information. The virtual surroundings are theoretically overlaid on the real world and contain the virtual objects that assist and inform the driver during the journey. However, projection takes place only onto part of the windshield so that the additional information cannot be arranged arbitrarily in the field of view of the driver.

Figure 2:
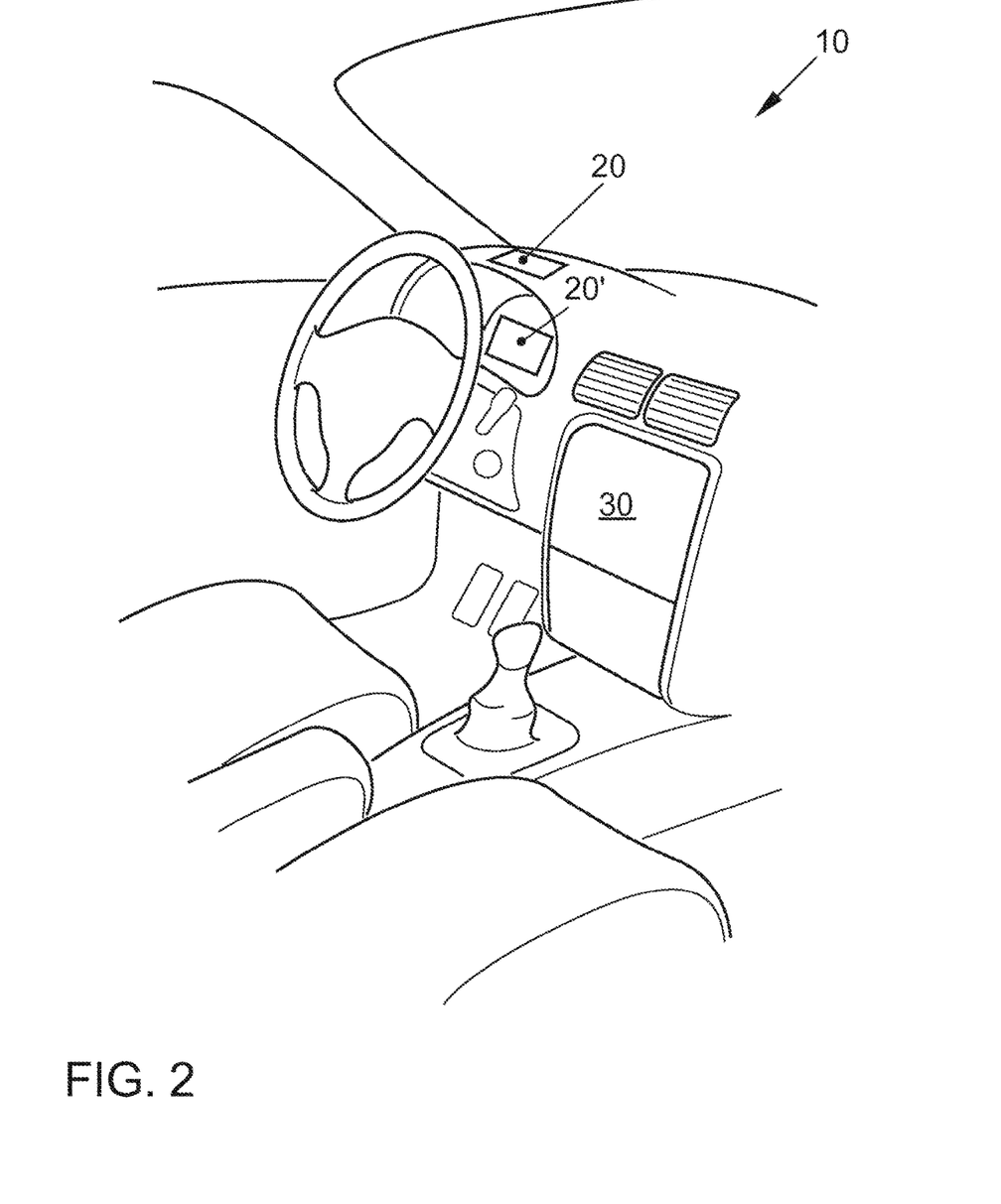
FIG. 2 shows the typical cockpit of a transportation vehicle.

FIG. 2 shows the cockpit of the transportation vehicle 10. It shows a passenger car. However, any other transportation vehicles are likewise conceivable as the transportation vehicle 10. Examples of further vehicles are buses, utility vehicles, in particular, trucks Lkw, agricultural machines, construction machines, rail vehicles, etc. The use of the Ser. No. 18/235,860 disclosed embodiments would generally be possible for land vehicles, rail vehicles, watercraft, and aircraft.

In the cockpit, three display units of an infotainment system are shown. This is the head-up display 20 and a touch-sensitive screen 30, which is mounted in the center console, and a smaller display that is part of the instrument cluster 110. During the journey, the center console is not within the field of view of the driver. For this reason, the AR superpositions are superimposed on the HUD display unit 20 during the journey.

The touch-sensitive screen 30 is here used for operating functions of the transportation vehicle 10. For example, it can be used to control a radio, a navigation system, playback of stored musical pieces, and/or an air-conditioning system, other electronic devices or other comfort functions or applications of the transportation vehicle 10. Together, this is frequently referred to as an "infotainment system." An infotainment system in transportation vehicles, specifically passenger cars, denotes the combination of car radio, navigation system, hands-free system, driver assistance systems and further functions in a central operating unit. The term infotainment is a portmanteau word of the words information and entertainment. To operate the infotainment system, mainly the touch-sensitive screen 30 ("touchscreen") is used, wherein this screen 30 can be seen easily and operated by a driver of the transportation vehicle 10, but also by a front passenger of the transportation vehicle 10. In addition, mechanical operating elements, such as keys, knobs, or combinations thereof, such as, for example, push rotation controllers, can be arranged in an input unit 50 below the screen 30. Typically, steering wheel control of parts of the infotainment system is also possible. This unit is not illustrated separately but is considered to be part of the input unit 50.

Figure 3:
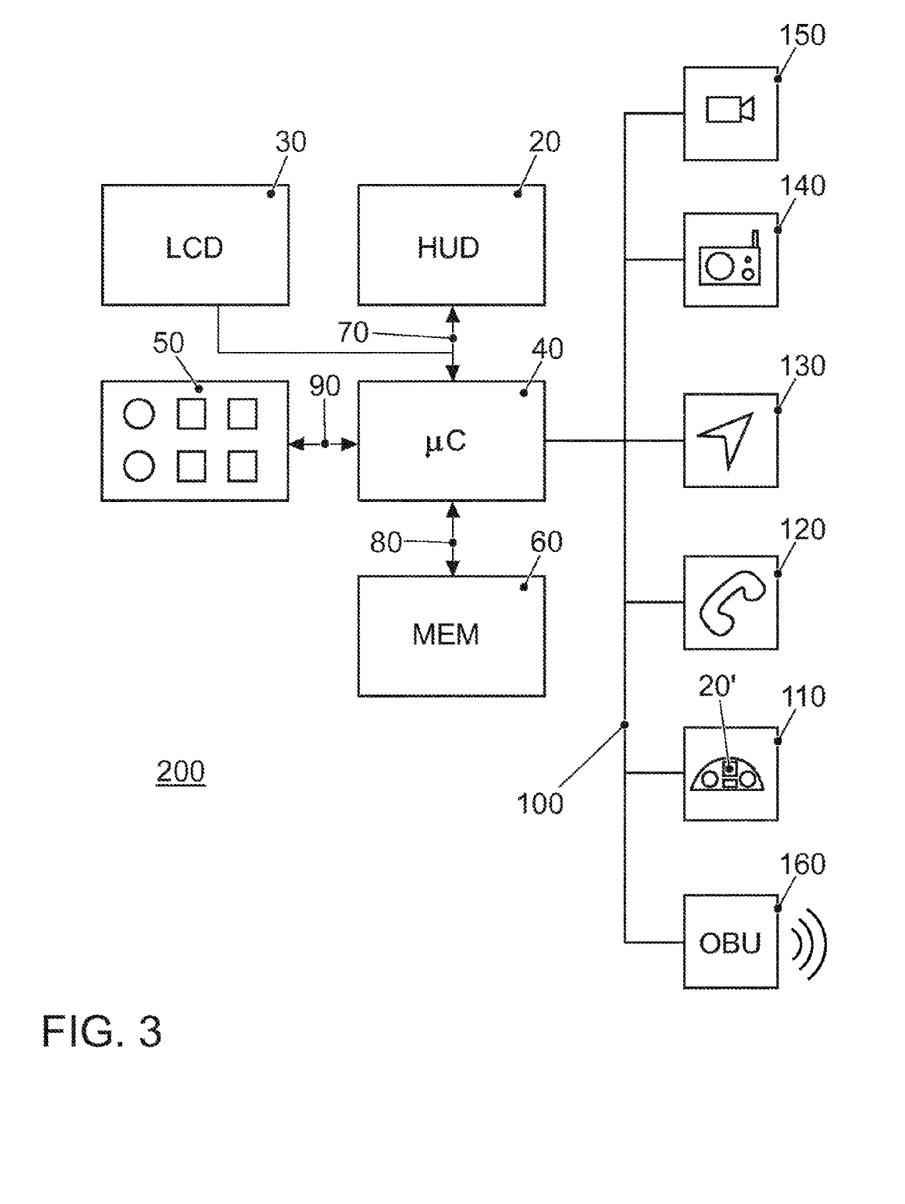
FIG. 3 shows the block diagram of the infotainment system of the transportation vehicle.

FIG. 3 schematically shows a block diagram of the infotainment system 200 and, by way of example, a few partial systems or applications of the infotainment system. The operating apparatus comprises the touch-sensitive display unit 30, a computation device 40, an input unit 50, and a memory 60. The display unit 30 comprises both a display surface for displaying variable graphic information and also an operating area (touch-sensitive layer) arranged over the display surface for inputting commands by way of a user.

The display unit 30 is connected to the computation device 40 via a data line 70. The data line can be designed in accordance with the LVDS standard a.k.a. low voltage differential signaling. The display unit 30 receives control data for controlling the display surface of the touchscreen 30 from the computation device 40 via the data line 70. Control data of the input commands are also transmitted via the data line 70 from the touchscreen 30 to the computation device 40. The reference numeral 50 denotes the input unit. It includes the already mentioned operating elements such as keys, knobs, sliders or rotation push controllers, with the aid of which the operator can effect inputs by way of the menu navigation. An entry is generally understood to mean the selection of a selected menu option and also the changing of a parameter, switching a function on and off, etc.

The memory device 60 is connected to the computation device 40 via a data line 80. A pictogram registry and/or a symbol registry with the pictograms and/or symbols for the possible superpositions of additional information is saved in the memory 60. The points/symbols that serve as a basis for the computation of the grid superposition can also be saved here.

The further parts of the infotainment system camera 150, radio 140, navigation device 130, telephone 120 and instrument cluster 110 are connected to the apparatus for operating the infotainment system via the data bus 100. A suitable data bus 100 is the high-speed option of the CAN bus in accordance with the ISO standard 11898-2. Alternatively, the use of a bus system based on ethernet technology, such as BroadR Reach, is also possible. Bus systems in which the data transmission is effected via optical waveguides are likewise usable. Examples mentioned are the MOST bus (media-oriented system transport) or the D2B bus (domestic digital bus). It should also be mentioned here that the camera 150 can be designed as a conventional video camera. In this case, it records 25 frames/s, which corresponds to 50 fields/s in the interlace recording mode. Alternatively, a special camera that records more images/s can be used to increase the accuracy of the object detection in the case of objects that move faster. A plurality of cameras can be used for vicinity observation. In addition, the abovementioned RADAR or LIDAR systems can be used supplementary or as an alternative to perform or expand vicinity observation. For wireless communication internally and with the outside, the transportation vehicle 10 is equipped with a communications module 160. This module is frequently also referred to as an on-board unit. It can be designed for mobile radio communication, for example, in accordance with the LTE standard a.k.a. long-term evolution. It can likewise be designed for WLAN communication, a.k.a. wireless LAN, be it for communication with devices belonging to passengers in the transportation vehicle or for vehicle-to-vehicle communication, etc.

The disclosed analysis method for avoiding impermissible field-of-view disturbances due to information superpositions on the part of a HUD display unit 20 will be explained below with reference to an exemplary embodiment.

Figure 4:
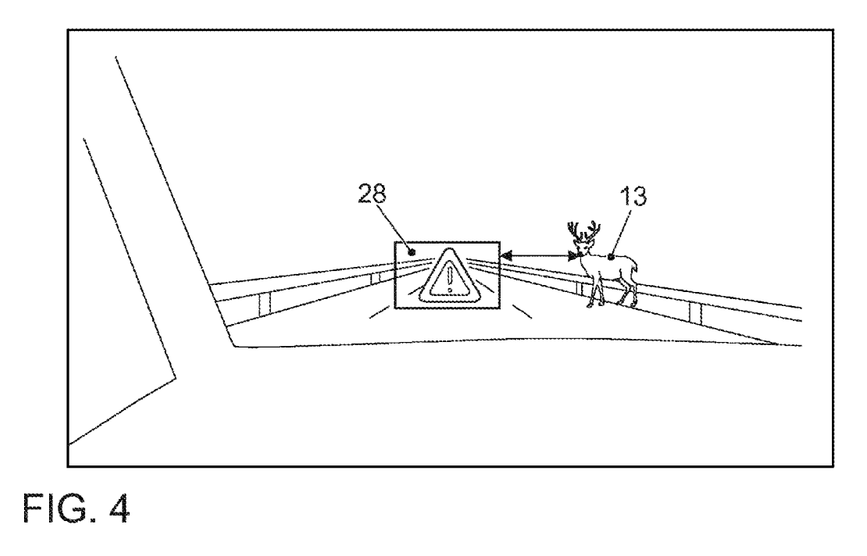
FIG. 4 shows a typical example of a superposition of virtual additional information into the field of view of the driver of a transportation vehicle.

To start, FIG. 4 shows an example of an information superposition by way of the head-up display. A danger symbol 28 is here projected into the field of view of the driver. In the case shown, the symbol is a warning triangle, which additionally has a bold border for emphasis purposes. The superposition takes place after the image evaluation of the images supplied by the camera 150 has shown that a deer 13 is standing at the roadside. The image evaluation takes place in the computation unit 40. Known algorithms for object detection can be used herefor. The superposition could also be located, for the "augmented reality," at the position of the deer 13 in the field of view of the driver. However, the risk is then that the superposition of the danger symbol 28 obscures the deer 13 and the driver can therefore not ascertain exactly where the danger lies.

Figure 5:
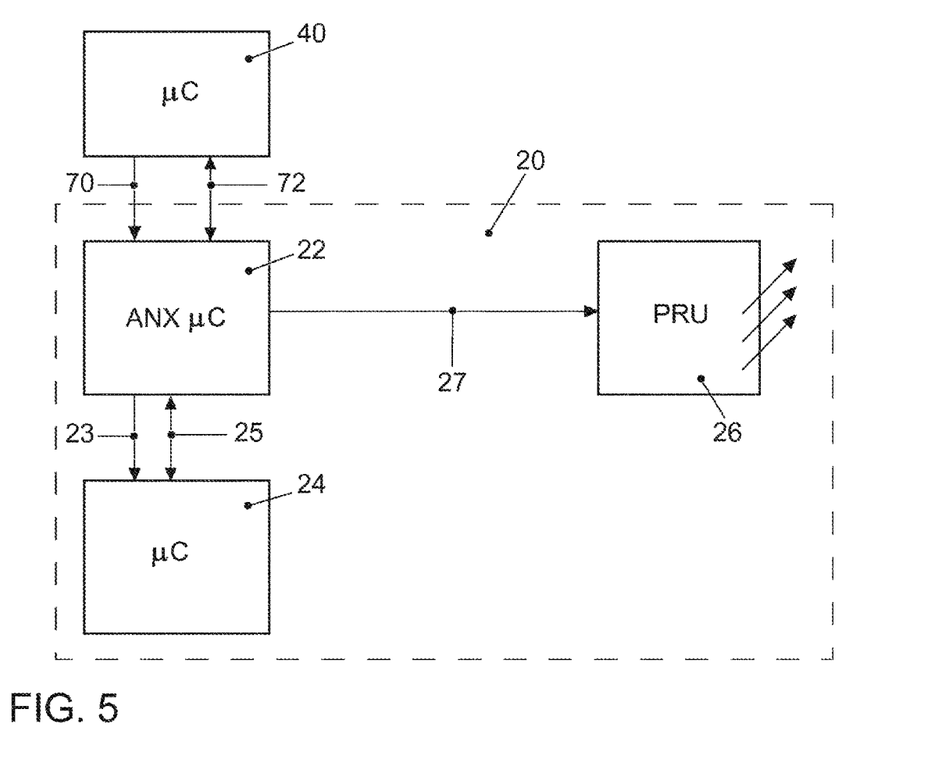
FIG. 5 shows a simplified block diagram of a head-up display unit.

FIG. 5 shows a block diagram for the head-up display 20. The HUD 20, as already shown in FIG. 3, is connected to the computation unit 40. They are linked for the transmission of the image data. This is the data line 70, previously mentioned, for the transmission of the calculated image data in the LVDS format. The other bus link 72 shown corresponds to a bus interface by which control, configuration and status data can be exchanged. An example is a bus interface of the type I2C (inter-integrated circuit bus). The head-up display itself consists substantially of three components. The most important is the projection unit 26, which includes as the image-generating unit, in addition to the light sources, the optical unit for beam shaping. This projection unit 26 receives the image data not directly from the computation unit 40 but from a drive unit 22 that is internal to the HUD and converts the image data for controlling the projection unit 26 into the suitable format. This drive unit 22 also includes an image analysis function, which will be explained in more detail below. In addition, a further microcontroller 24 is provided in the head-up display 20. The microcontroller 24 serves for controlling the brightness of the head-up display 20 and also for controlling other settings. The evaluation of the results of the image analysis function also takes place in the microcontroller 24, as will be explained below.

Figure 6:
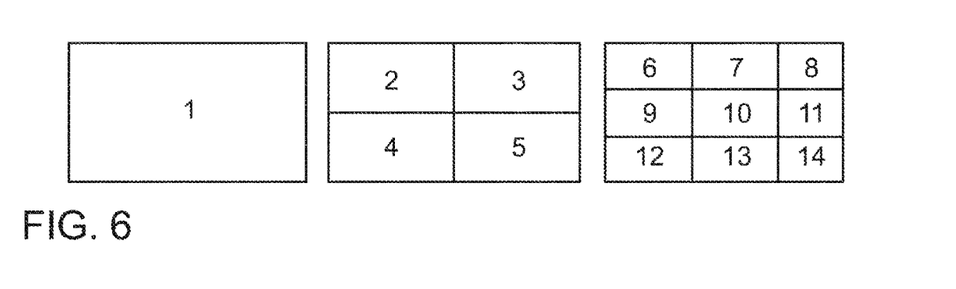
FIG. 6 shows an illustration of the analysis window when checking for field-of-view disturbances by way of AR superpositions.

First, the image analysis function will be explained in more detail. FIG. 6 shows the principle of the image analysis. Three successive images of the video data stream provided by the camera 150 are shown. Typically, the cameras used supply 30 frames/s. This corresponds to the old known TV standard NTSC. In the first image, the analysis window is set to full image size. In the second image, the image is divided into four segments of identical size. The image analysis takes place separately for each individual segment. In the third image shown, the image is analyzed separately in nine segments of identical size. The image analysis therefore becomes increasingly finer from left to right.

The image analysis function for 30-Hz cameras would correspondingly cycle 10 times per second. The image analysis of an individual segment or of the entire image consists in the filling degree being ascertained. Here, the image points that are required for the respective information superposition are counted, and this number is set into relation with the total number of the image points of the image that is displayable by the HUD unit for the case that the analysis window extends over the entire image. When an image segment is analyzed, the number of the reproduced image points in this segment is set into relation with the total number of the image points in the respective segment. These values thus ascertained are buffered in a memory of the microcontroller 24 and kept for the evaluation algorithm.

Figure 7:
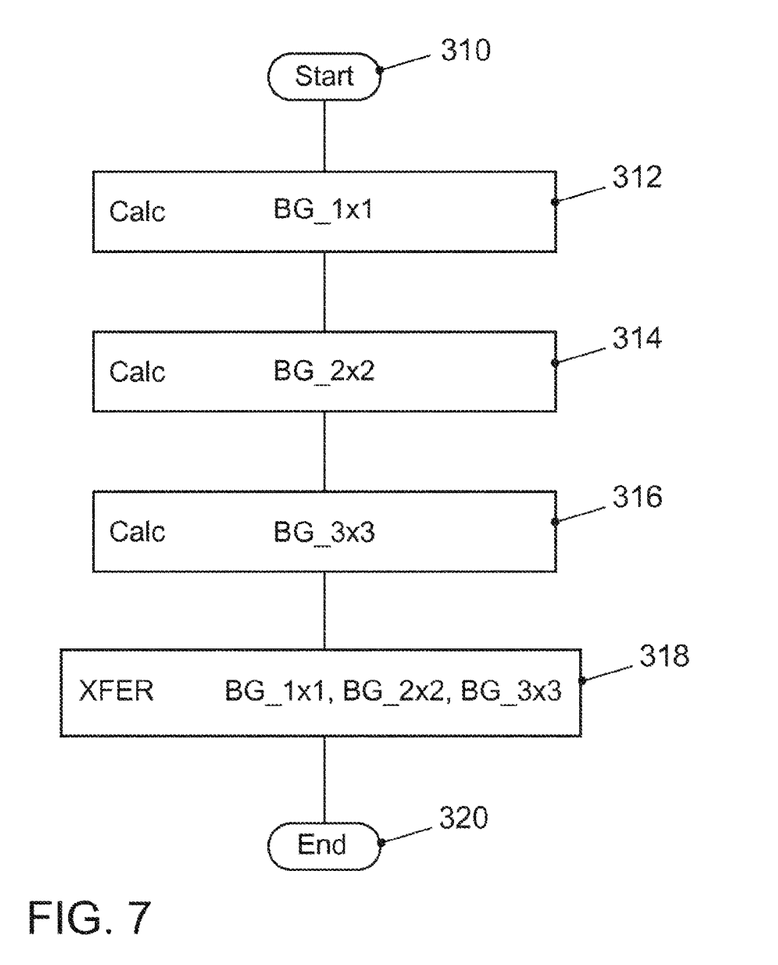
FIG. 7 shows a flowchart for a program with which an image analysis is performed.

The data ascertainment of the analysis function is explained with respect to the flowchart illustrated in FIG. 7. The program is executed in the drive unit 22. The program start is denoted with the reference sign 310. In the program operation at 312, the filling degree for the first image to be analyzed is calculated. This is done as explained above. Subsequently, in program operation at 314, the filling degrees for the following image, which is divided into four segments of identical size, are calculated. In the program operation at 316, the filling degrees for the third image, which is divided into four segments of identical size, are calculated. Once the image analysis operations have been performed, the calculated data are transmitted to the microcontroller 24 in program operation at 318. Here, the received data are stored in the buffer and kept for further evaluation. The program ends in program operation at 320.

Figure 8:
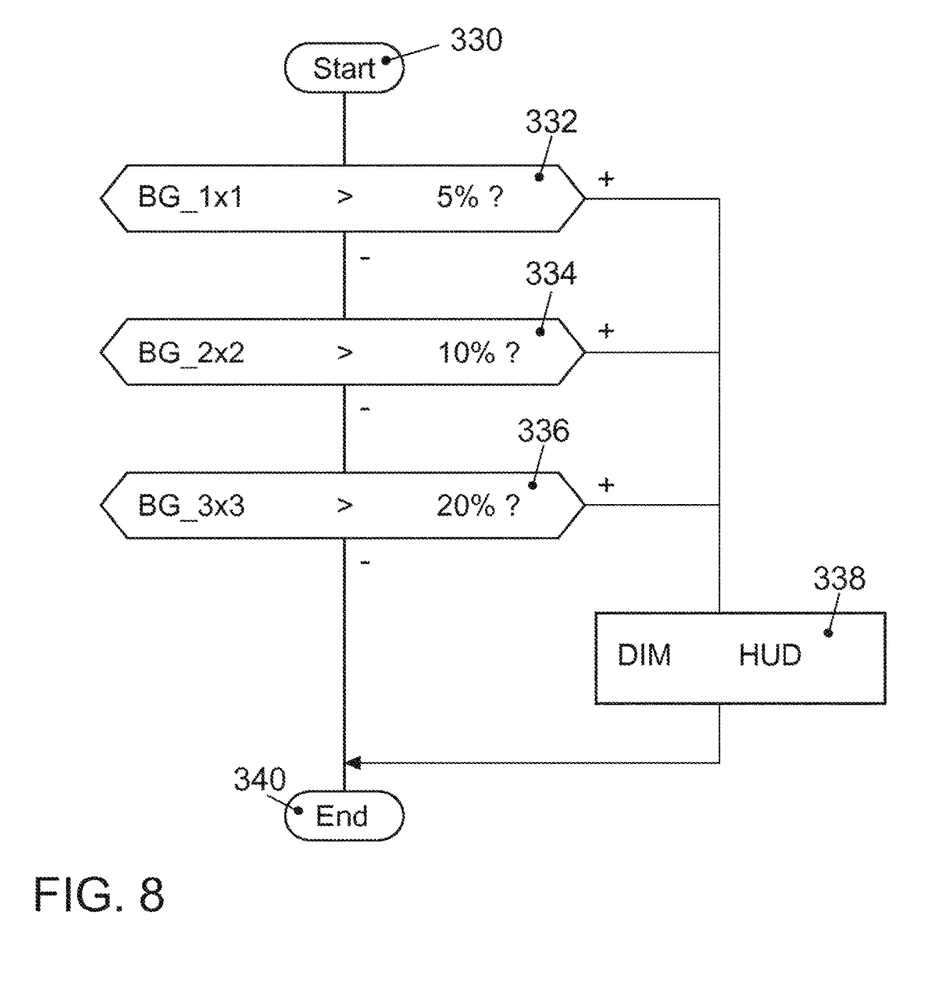
FIG. 8 shows a flowchart for a program with which the results of the image analysis are evaluated to detect a first type of field-of-view disturbances.

The first part of the data evaluation is explained with reference to the flowchart in FIG. 8. This program is executed by the microcontroller 24. After the program start 330, a determination is made in program operation at 332 as to whether the ascertained filling degree BG_1×1 of the unsegmented analysis window is greater than 5%. In this case, there is already a risk of the obscuration of real objects in the field of view. If not, it is examined in operation at 334 whether one of the ascertained filling degrees BG_2×2 of the image which has been divided into four segments of identical size exceeds the value of 10%. Then, too, it is concluded that a bothersome obscuration of objects may occur. If this is not the case either, it is examined in program operation at 336 whether one of the filling degrees BG_3×3 ascertained of the image which has been divided into nine segments of identical size exceeds the value of 20%. If this is not the case either, it is concluded that there is no risk of obscuration, and the program is ended in program operation at 340. In the other cases, the program branches off to program operation at 338, in which a measure is taken that averts the risk of obscuration. An example of such a measure is the switching off of the superposition and the decrease in brightness of the superposition. Although it would also be possible to inform the computation unit 40 as to the fact that it can then calculate a reduced form of the superposition, this can run into problems in practical realization. A greater development and test outlay is required herefor. Possibly, other microcontrollers and interfaces would need to be used therefor.

Figure 9:
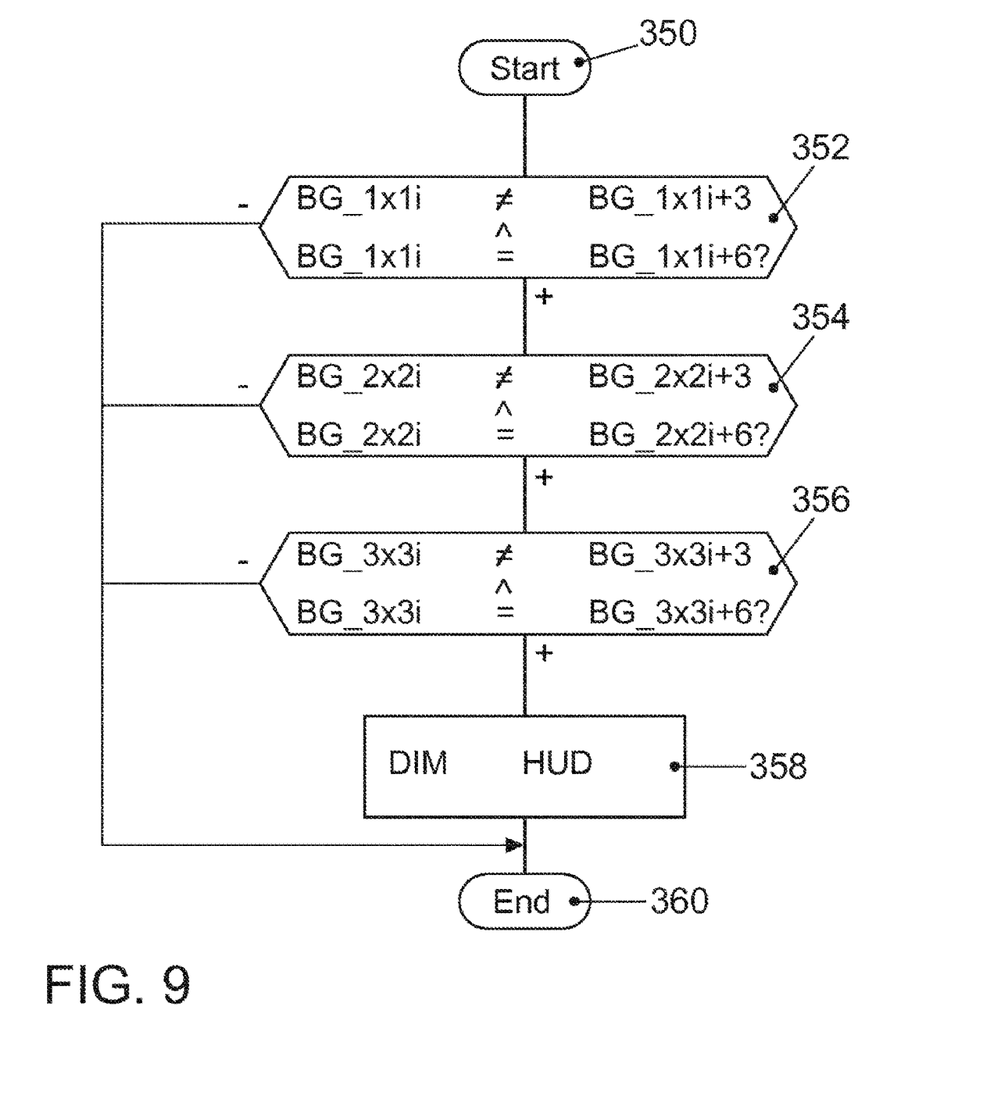
FIG. 9 shows a flowchart for a program with which the results of the image analysis are evaluated to detect a second type of field-of-view disturbances.

The second part of the data evaluation is explained on the basis of the flowchart in FIG. 9. The program starts in program operation at 350. In program operation at 352, it is examined whether the successive values BG_1×1i and BG_1×1i+3 are unequal, whereas BG_1×1i and BG_1×1i+6 are equal. The index i here denotes the image number. If so, the further test as to whether the successive values BG_2×2i and BG_2×2i+3 are unequal, whereas BG_2×2i and BG_2×2i+6 are equal is performed in program operation at 354. If so, the further test as to whether BG_3×3i and BG_3×3i+3 are unequal, whereas BG_2×2i and BG_2×2i+6 are equal is performed in program operation at 356. If this has also been met, it is concluded that a pulsing/blinking representation of the superposition is present which is undesirable because it can distract from events on the road. This special form of the test would detect blinking at a frequency of approximately 4 Hz. For other frequencies, the test can be correspondingly adapted.

However, how many images per second can be analyzed is dependent on how powerful the special chip that performs the image analysis is. In another exemplary embodiment, the chip can analyze 60 image segments per second. In the case of the division of the images into 14 image segments, as shown in FIG. 6, 14 image segments are analyzed per cycle. Owing to the time this requires (approximately 250 ms) and the further running video stream (30 fps), this involves 7 successive images. In concrete terms, the procedure in this exemplary embodiment is as follows: of the first image, the complete image segment 1 and the image square with the number 2 are analyzed. Of the second image in the video stream, the two image squares with the numbers 3 and 4 are analyzed. Of the third image in the video stream, the image square with the number 5 and the 3×3 image segment with the number 6 are analyzed. Of the fourth image in the video stream, the two 3×3 image segments with the numbers 7 and 8 are analyzed. Of the fifth image in the video stream, the two 3×3 image segments with the numbers 9 and 10 are analyzed. Of the sixth image in the video stream, the two 3×3 image segments with the numbers 11 and 12 are analyzed. Of the seventh image in the video stream, the two 3×3 image segments with the numbers 13 and 14 are analyzed. For this exemplary embodiment, the flowcharts in FIGS. 7 to 9 need to be adapted accordingly.

In other exemplary embodiments, different segmentation of the HUD display unit 20 can be performed for the test. For example, the number of the segments can also be 4×4=16 segments.

The queries as to whether values to be compared are equal could also be designed such that a specific tolerance range of deviations within which equivalence is still recognized during the comparison is accepted.

All the examples mentioned here and also specific formulations should be understood without limitation to refer to such specifically mentioned examples. For example, a person skilled in the art will recognize that the block diagram illustrated here represents a conceptional view of an exemplary circuit arrangement. Similarly, it is clear that an illustrated flowchart, state transition diagram, pseudocode and the like represent various options for representing processes that can be substantially stored in computer-readable media and can thus be performed by a computer or processor. The object mentioned in the patent claims can expressly also be a person.

It is to be understood that the proposed method and the associated apparatuses can be realized in various forms of hardware, software, firmware, special processors, or a combination thereof. Special processors can comprise application-specific integrated circuits (ASICs), reduced instruction set computer (RISC) and/or field programmable gate arrays (FPGAs). The method proposed and the apparatus may be realized as a combination of hardware and software. The software may be installed as an application program on a program memory apparatus. This is typically a machine based on a computer platform having hardware, such as, for example, one or more central processing units (CPUs), a random-access memory (RAM) and one or more input/output (I/O) interfaces. Typically, an operating system is additionally installed on the computer platform. The various processes and functions that were described here can be a part of the application program or be a part that is executed via the operating system.

The disclosure is not limited to the exemplary embodiments described here. There is scope for various adaptations and modifications that a person skilled in the art would consider, owing to their expert knowledge, as also being part of the disclosure.

The disclosure is explained in more detail in the exemplary embodiments using the example of the use in transportation vehicles. The possibility of using it in aircraft and helicopters, for example, during landing maneuvers or search missions, etc., is also indicated here.

However, it is noted that the use is not limited thereto. The disclosed embodiments can be used whenever the field of view of a driver, of an operator or simply just of a person having smartglasses can be enriched with AR superpositions.

Even in remote control devices such as robots or drones, in which the remote control is effected via a monitor on which a camera image is shown, AR superpositions can make operation easier. Consequently, this represents another possible use.

LIST OF REFERENCE SIGNS

10 Transportation vehicle
13 Deer
20 Head-up display HUD
20' Display instrument cluster
21 Virtual projection surface
22 Analysis chip
23 LVDS bus
24 Microcontroller
25 Bus
26 Projection unit
27 Data line
28 Danger symbol
30 Touch-sensitive display unit
40 Computation unit
50 Input unit
60 Memory unit
70 Data line to the display unit
80 Data line to the memory unit
90 Data line to the input unit
100 Databus
110 Instrument cluster
120 Telephone
130 Navigation device
140 Radio
150 Camera
160 Communications module
200 Infotainment system
310-360 Various program operations

The invention claimed is:

1. A method for avoiding a field-of-view disturbance for an operator of a transportation vehicle, the method comprising:
    superposing virtual additional information, via a display unit, into a field of view of the operator of the transportation vehicle;
    performing image analysis relative to the field of view of the operator to detect whether the superposition of the virtual additional information causes disturbance to the field of view of the operator including obscuration of at least one object in the real environment as a field-of-view disturbance, wherein image analysis is performed to check whether the superposition causes an obscuration of regions in the field of view of the operator, and, in the check relating to obscuration of regions in the field of view, analyzing three successive images, wherein for the first image, the filling degree of the total image is determined, for the second image, the filling degrees of a first number of image segments of identical size are determined collectively less than the total image, and, for the third image, the filling degrees of a second number of image segments of identical size are determined collectively less than the total image and greater than the first number of image segments; and
    preventing the field-of-view disturbance by altering the superposition of virtual additional information in response to the field-of-view disturbance being detected.

2. The method of claim 1, wherein image analysis of a plurality of successive images with superpositions of virtual additional information is performed to check whether the superpositions cause blinking, flashing or pulsing in the field of view of the operator.

3. The method of claim 1, wherein the image analysis for checking whether the obscuration of regions in the field of view of the operator includes analysis of a plurality of successive images, wherein each image is divided, image-to-image, into increasingly fine segments, and the segments are analyzed individually.

4. The method of claim 3, wherein the image analysis for checking whether the obscuration of regions in the field of view of the operator includes ascertaining a filling degree of a respective image or of a respective segment that is brought about by the superposition of the virtual additional information.

5. The method of claim 4, wherein the filling degree is determined by calculating a ratio of a plurality of image points that have been filled by the superposition of the virtual additional information to the total number of the image points that are fillable.

6. The method of claim 1, wherein, in the check relating to obscuration of regions in the field of view, the three successive images are analyzed, wherein for the first image, the filling degree of the total image is determined, for the second image, the filling degrees of four image segments of identical size are determined, and, for the third image, the filling degrees of nine image segments of identical size are determined.

7. The method of claim 6, wherein the ascertained filling degrees of the image and the segments are checked in stages and the presence of a problem relating to the obscuration of regions in the field of view of the operator is detected in response to the check leading to an ascertainment that at least one of the checked criteria is met.

8. The method of claim 7, wherein, for checking whether the superpositions cause blinking, flashing or pulsing in the field of view of the operator, the ascertained filling degrees of a number of successive check cycles are analyzed, wherein the presence of a problem relating to a bothersome blinking, flashing or pulsing of the superpositions in the field of view of the operator is detected in response to periodic changes of the ascertained filling degrees being ascertained.

9. The method of claim 1, wherein the superposition is switched off or the brightness of the superposition is decreased to prevent the field-of-view disturbance.

10. The method of claim 1, wherein the superposition of the virtual additional information is superposed into the field of view of the operator using contact-analogous augmented reality with analogue to one or more detected objects.

11. An apparatus for performing a method to avoid disturbance to a field of view of an operator of a transportation vehicle as a field-of-view disturbance including obscuration of at least one object in the real environment, the apparatus comprising:
    a display unit with which virtual additional information is superposed into the field of view of the operator;
    an interface for receiving images with which the virtual additional information is superposed into the field of view of the operator;

an image analysis unit and an evaluation unit configured to detect whether the field-of-view disturbance is caused by the superposition of the virtual additional information into the field of view of the operator, wherein the image analysis unit and evaluation unit are furthermore configured to prevent the field-of-view disturbance by altering the superposition of virtual additional information in response to detection of the field-of-view disturbance, wherein image analysis is performed to check whether the superposition causes an obscuration of regions in the field of view of the operator, and, in the check relating to obscuration of regions in the field of view, analyzing three successive images, wherein for the first image, the filling degree of the total image is determined, for the second image, the filling degrees of a first number of image segments of identical size are determined collectively less than the total image, and, for the third image, the filling degrees of a second number of image segments of identical size are determined collectively less than the total image and greater than the first number of image segments.

12. The apparatus of claim 11, wherein the image analysis unit and the evaluation unit control a switching off of the superposition or a decrease in the brightness of the superposition in response to a field-of-view disturbance being detected.

13. The apparatus of claim 11, wherein image analysis of a plurality of successive images with superpositions of virtual additional information is performed to check whether the superpositions cause blinking, flashing or pulsing in the field of view of the operator.

14. The apparatus of claim 5, wherein the image analysis for checking whether the obscuration of regions in the field of view of the operator includes analysis of a plurality of successive images, wherein each image is divided, image-to-image, into increasingly fine segments, and the segments are analyzed individually.

15. The apparatus of claim 14, wherein the image analysis for checking whether the obscuration of regions in the field of view of the operator includes ascertaining a filling degree of a respective image or of a respective segment that is brought about by the superposition of the virtual additional information.

16. The apparatus of claim 15, wherein the filling degree is determined by calculating a ratio of a plurality of image points that have been filled by the superposition of the virtual additional information to the total number of the image points that are fillable.

17. The apparatus of claim 11, wherein, in the check relating to obscuration of regions in the field of view, the three successive images are analyzed, wherein for the first image, the filling degree of the total image is determined, for the second image, the filling degrees of four image segments of identical size are determined, and, for the third image, the filling degrees of nine image segments of identical size are determined.

18. The apparatus of claim 17, wherein the ascertained filling degrees of the image and the segments are checked in stages and the presence of a problem relating to the obscuration of regions in the field of view of the operator is detected in response to the check leading to an ascertainment that at least one of the checked criteria is met.

19. The apparatus of claim 13, wherein, for checking whether the superpositions cause blinking, flashing or pulsing in the field of view of the operator, the ascertained filling degrees of a number of successive check cycles are analyzed, wherein the presence of a problem relating to a bothersome blinking, flashing or pulsing of the superpositions in the field of view of the operator is detected in response to periodic changes of the ascertained filling degrees being ascertained.

20. The apparatus of claim 11, wherein the superposition is switched off or the brightness of the superposition is decreased to prevent the field-of-view disturbance.

21. The apparatus of claim 11, wherein the superposition of the virtual additional information is superposed into the field of view of the operator using contact-analogous augmented reality with analogue to one or more detected objects.

22. A transportation vehicle comprising the apparatus of claim 11.

23. A non-transitory computer readable medium including a computer program that includes instructions for performing a method for avoiding disturbance to a field of view of an operator of a transportation view as a field-of-view disturbance upon being executed in a computation unit comprising an image analysis unit and an evaluation unit wherein the method comprises:

superposing virtual additional information via a display unit into the field of view of the operator;

performing image analysis to detect whether the superposition of the virtual additional information into the field of view of the operator causes the field-of-view disturbance including obscuration of at least one object in the real environment, wherein image analysis is performed to check whether the superposition causes an obscuration of regions in the field of view of the operator, and, in the check relating to obscuration of regions in the field of view, analyzing three successive images, wherein for the first image, the filling degree of the total image is determined, for the second image, the filling degrees of a first number of image segments of identical size are determined collectively less than the total image, and, for the third image, the filling degrees of a second number of image segments of identical size are determined collectively less than the total image and greater than the first number of image segments; and preventing the field-of-view disturbance by altering the superposition of virtual additional information in response to the field-of-view disturbance being detected.

* * * * *